Figure 1:
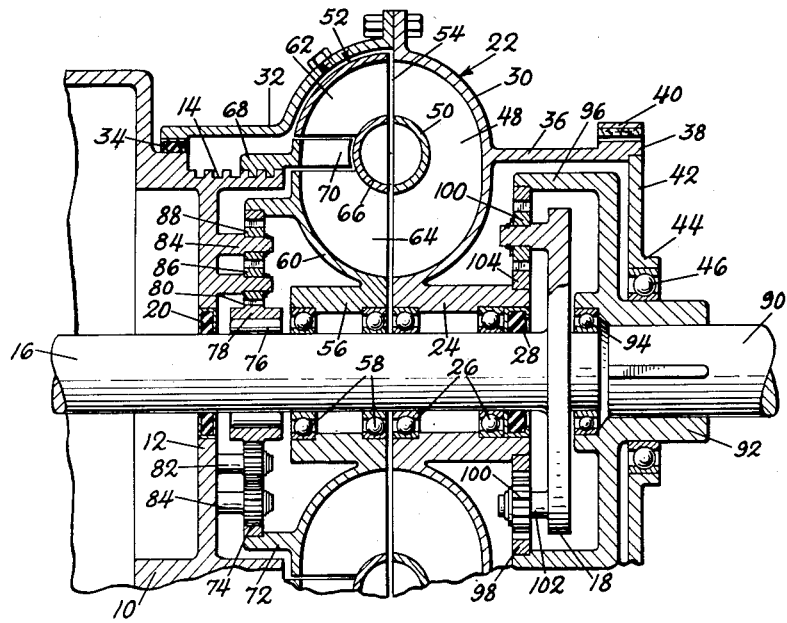

March 14, 1944.  J. JANDASEK  2,344,248

FLUID DRIVE

Filed May 31, 1941

INVENTOR.
JOSEPH JANDASEK
BY
ATTORNEY

Patented Mar. 14, 1944

2,344,248

UNITED STATES PATENT OFFICE 2,344,248

FLUID DRIVE

Joseph Jandasek, Detroit, Mich., assignor to Bendix Aviation Corporation, Detroit, Mich., a corporation of Delaware Application May 31, 1941, Serial No. 396,132

8 Claims. (Cl. 74—189.5)

This invention relates to fluid drives and more particularly to combined mechanical and fluid transmissions.

Broadly the invention contemplates a transmission having separate paths of power flow, one mechanical and the other fluid transmission.

An object of the invention is to provide a transmission including a driving shaft and a driven shaft, mechanical means coupling the shafts, and fluid transmission means receiving power from the coupling means and transferring the power received to the driving shaft.

Another object of the invention is to provide a transmission including a driving shaft and a driven shaft, a mechanical coupling for the shafts, a fluid coupling for the mechanical coupling and the driving shaft, and means for disassociating the fluid coupling.

Other objects and advantages of the invention will appear from the following description taken in connection with the drawing forming a part of this specification, and in which—

Figure 2:
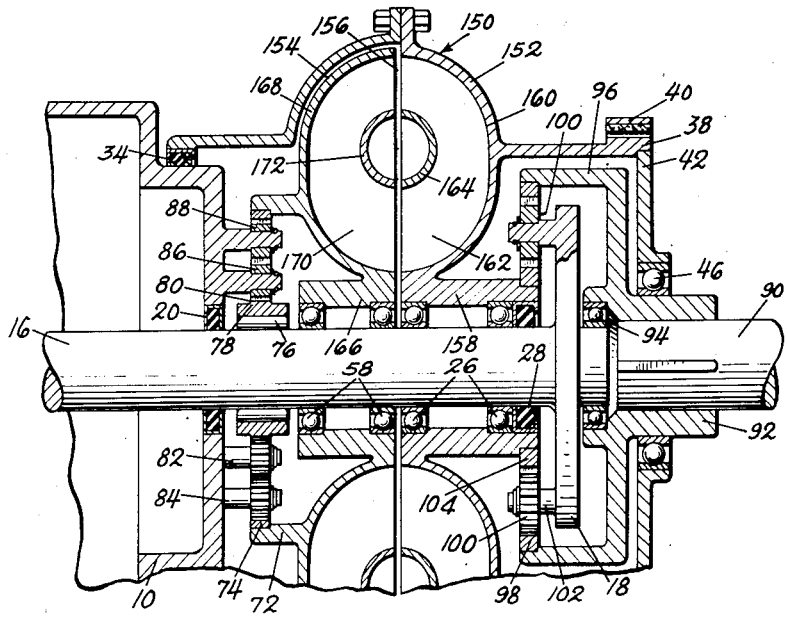

Fig. 1 is a vertical sectional view of an apparatus embodying the invention; and Fig. 2 is a modification of the structure illustrated in Fig. 1.

In both the preferred embodiment of the invention and in the modification thereof, the distinguishing feature is a combined fluid and mechanical drive of a two-way regenerative type characterized in that the turbine of a torque converter and/or a fluid coupling is geared to the driving shaft.

Referring to Fig. 1 of the drawing, 10 represents a stationary flywheel housing having a concentrically disposed hub 12 and an annular externally threaded flange 14 concentrically disposed with relation to the hub. A driving shaft 16 extended through the hub 12 has thereon a disc 18, and fitted in the hub is a fluid seal 20 embracing the shaft.

An impeller indicated generally at 22 includes a hub 24 supported for rotation on spaced bearings 26 fitted on the driving shaft 16, and a fluid seal 28 fitted in the hub embraces the shaft 16. The hub has thereon a shroud or web 30 having a peripheral flange, and bolted or otherwise secured to this flange is a housing 32 supporting a fluid seal 34 embracing an annular shoulder on the housing 10.

The shroud 30 has a laterally extended drum 36 provided with a braking surface 38 for cooperation with a brake 40, and the outer end of the drum 36 is closed as by a disc 42 having a concentrically disposed bearing support 44 for the reception of a bearing 46. The shroud 30 also has arranged thereon a plurality of blades 48 supporting an inner shroud 50.

A two-stage turbine indicated generally at 52 is associated with the impeller 22, and provides in conjunction therewith a vortex chamber 54 for the circulation of fluid. This turbine includes a hub 56 supported for rotation on spaced bearings 58, and the hub has thereon a web or shroud 60 supporting the first and second stages 62 and 64 of the turbine secured together as by an inner shroud 66.

A reaction member 68 mounted for travel on the threaded annular member 14 has arranged thereon blades or vanes 70 adapted to move into and out of the vortex chamber 54 between the first and second stages of the turbine. The shroud 60 also has a laterally extended sleeve or drum 72 concentrically disposed with relation to the driving shaft, and a ring gear 74 is suitably secured to the drum. A one-way clutch 76 supports for rotation, in one direction only, a collar 78 having thereon a sun gear 80 diametrically disposed with relation to the ring gear 74, and stub shafts 82 and 84 arranged in spaced pairs on the flywheel housing 10 support for rotation pinions 86 and 88 in mesh with one another. The pinion 86 is in mesh with the sun gear 80, and the pinion 88 is in mesh with the ring gear 74.

A driven shaft 90 has a hub 92 supported for rotation in coaxial relation to the driving shaft 16 by the bearing 46 and also by a bearing 94 fitted on the adjacent end of the driving shaft. The hub has thereon within the drum 36 a drum 96 supporting a ring gear 98 in mesh with spaced planet pinions 100 mounted for rotation on stub shafts 102 carried on the disc 18 of the driving shaft, and the pinions 100 mesh with a sun gear 104 secured to the hub 24 of the impeller 22.

In a normal operation, assuming that the vortex chamber 54 is filled with fluid to a predetermined degree of its capacity, sufficient to provide for expansion of the fluid due to heat, upon transmission of force through the driving shaft 16, the planet pinions 100 rotatable on the stub shafts 102 carried by the disc 18 on the driving shaft are rotated in a path around the driving shaft. This movement of the pinions transmits force to the ring gear 98, and consequently the drum 96, resulting in transmission torque to the driven shaft, and simultaneously therewith the planet pinions 100 transmit torque to the sun gear 104 on the hub of the impeller 22, resulting in driving the impeller.

The impeller energizes the fluid in the vortex chamber 54 and the energy of the fluid is received on the first stage 62 of the turbine 52, and on the vanes 70 of the reaction member 68, causing rotation of the turbine. This rotation of the turbine results in driving the train of gears 74, 80, 86 and 88, and also the collar 78 connected through the one-way clutch 76 to the driving shaft.

As the speed of rotation of the impeller increases, the energy of the fluid increases proportionately, and this increased energy of the fluid acting on the vanes of the turbine causes increase in the speed of rotation thereof. As this increased speed approaches that of the impeller, the angle of flow of the fluid leaving the first stage 62 of the turbine shifts from impinging on the faces of the vanes 70 carried by the reaction member 68 to impinge upon the backs of the vanes 70, causing the reaction member to travel on the threaded member 14 out of the vortex chamber 54, and upon retraction of the reaction member the unit functions as a fluid coupling.

In instances where it is desirable to eliminate the fluid drive, the brake 40 is applied or set to hold the impeller 22 against movement, and also to hold the sun gear against movement. When the sun gear is held, the planetary gearing system operates to effect the minimum increase in speed of the driven shaft.

Referring now to Fig. 2, the torque converter unit illustrated in Fig. 1 is replaced by a fluid coupling, indicated generally at 150. This fluid coupling may be of any preferred type. As shown, it includes an impeller 152 and a turbine 154 providing in conjunction with one another a vortex chamber 156 for the circulation of fluid.

As shown, the impeller 152 includes a hub 158 supported for rotation on a driven shaft, and the hub has thereon a web or shroud 160, and arranged on this shroud are blades 162 supporting an inner shroud 164. Correspondingly, the turbine or the runner 154 includes a hub 166 also supported for rotation on the driven shaft, and the hub 166 has thereon a shroud 168, and arranged on this shroud are blades 170 supporting an inner shroud 172.

In fluid couplings of this type, upon rotation of the impeller 152 the fluid in the vortex chamber 156 is energized, and the energy of the fluid is received by the turbine 154, resulting in energization thereof. Otherwise, the operation of the unit is identical to that of the preferred embodiment of the invention, and, accordingly, further explanation as to the operation of this modification is deemed unnecessary.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising a driving shaft and a driven shaft, fluid power transmitting means, torque changing means connecting the driving shaft to the driven shaft and to the fluid power transmitting means, and torque multiplying means connecting the power transmitting means to the driving shaft.

2. A transmission comprising a driving shaft and a driven shaft, a fluid power transmitting means supported for rotation on the driving shaft having cooperative elements, torque changing means connecting the driving shaft to the driven shaft and to one of the elements, and a train of gears including a one-way drive between the other element and the driving shaft.

3. A transmission comprising a driving shaft and a driven shaft, a fluid power transmitting means movable on the driving shaft, torque changing means connecting the driving shaft to the driven shaft and to the fluid power transmitting means, speed-changing means including a one-way drive connecting the latter to the driving shaft, and means for holding the fluid power transmitting means effective to increase the speed of the driven shaft.

4. A transmission comprising a driving shaft and a driven shaft, a fluid power transmitting means on the driving shaft, a torque changing means connecting the driving shaft to the driven shaft and to the fluid power transmitting means, and speed increasing means connecting the latter to the driving shaft.

5. A transmission comprising a driving shaft, a driven shaft, a fluid coupling rotatable on the driving shaft, a planetary gear connecting the driving shaft to the driven shaft and to one element of the fluid coupling, a train of gears connected to the other element of the fluid coupling, and a one-way drive connecting the train of gears to the driving shaft.

6. A transmission comprising a driving shaft, a driven shaft, a fluid coupling rotatable on the driving shaft, a planetary gear connected between the shafts and to one element of the fluid coupling, and means including a train of gears connecting another element of the fluid coupling to the driving shaft.

7. A transmission comprising a driving shaft and a driven shaft, a fluid power transmission on the driving shaft, a planetary gear system including planet pinions carried by the driving shaft, an orbit gear in mesh with the pinions connected to the driven shaft, and a sun gear in mesh with the pinions and connected to the fluid power transmission, and torque multiplying means connecting the fluid power transmission to the driving shaft.

8. A transmission comprising a driving shaft and a driven shaft, a fluid power transmission including a driving element and a driven element, a planetary gear system connecting the driving shaft to the driven shaft and to the driving element of the fluid power transmission, and means connecting the driven element of the fluid power transmission to the driving shaft including a driving means, a driven means, and a reaction means.

JOSEPH JANDASEK.